US011630920B2

(12) United States Patent
Durham et al.

(10) Patent No.: US 11,630,920 B2
(45) Date of Patent: Apr. 18, 2023

(54) MEMORY TAGGING FOR SIDE-CHANNEL DEFENSE, MEMORY SAFETY, AND SANDBOXING

(71) Applicant: Intel Corporation, Santa Clara, CA (US)

(72) Inventors: David M. Durham, Beaverton, OR (US); Michael Lemay, Hillsboro, OR (US); Siddhartha Chhabra, Portland, OR (US); Kai Cong, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 262 days.

(21) Appl. No.: 16/024,257

(22) Filed: Jun. 29, 2018

(65) Prior Publication Data
US 2019/0042799 A1 Feb. 7, 2019

(51) Int. Cl.
*G06F 21/72* (2013.01)
*G06F 21/73* (2013.01)
(Continued)

(52) U.S. Cl.
CPC .......... *G06F 21/72* (2013.01); *G06F 12/0895* (2013.01); *G06F 21/53* (2013.01);
(Continued)

(58) Field of Classification Search
USPC ........................................................ 713/189
See application file for complete search history.

(56) References Cited

U.S. PATENT DOCUMENTS

| 6,594,751 B1 * | 7/2003 | Leivent | G06F 12/123 711/209 |
| 6,629,213 B1 * | 9/2003 | Sharma | G06F 12/0866 711/144 |

(Continued)

FOREIGN PATENT DOCUMENTS

CN 106105089 A * 11/2016 ........... G06F 21/602

OTHER PUBLICATIONS

Author Unknown, ADI vs ROP, Barely Grasping the Small Picture blog, https://lazytyped.blogspot.com/2017/09/adi-vs-rop.html, Sep. 12, 2017, 3 pages.

(Continued)

*Primary Examiner* — Sakinah White Taylor
(74) *Attorney, Agent, or Firm* — Alliance IP, LLC

(57) ABSTRACT

A system may use memory tagging for side-channel defense, memory safety, and sandboxing to reduce the likelihood of successful attacks. The system may include memory tagging circuitry to address existing and potential hardware and software architectures security vulnerabilities. The memory tagging circuitry may prevent memory pointers from being overwritten, prevent memory pointer manipulation (e.g., by adding values), and increase the granularity of memory tagging to include byte-level tagging in cache. The memory tagging circuitry may sandbox untrusted code by tagging portions of memory to indicate when the tagged portions of memory include contain a protected pointer. The memory tagging circuitry provides security features while enabling CPUs to continue using and benefiting from speculatively performing operations. By co-locating all tagging information at a cacheline granularity with its associated data, the processor has all the information needed to perform access control decisions immediately and non-speculatively, while maintaining high performance and cache coherency.

24 Claims, 10 Drawing Sheets

(51) Int. Cl.
   *G06F 21/64*      (2013.01)
   *G06F 21/53*      (2013.01)
   *G06F 12/0895*    (2016.01)
   *H04L 9/06*       (2006.01)
   *H04L 9/00*       (2022.01)
   *H04L 9/32*       (2006.01)
   *G06F 21/75*      (2013.01)

(52) U.S. Cl.
   CPC ............ *G06F 21/64* (2013.01); *G06F 21/73* (2013.01); *G06F 21/75* (2013.01); *H04L 9/002* (2013.01); *H04L 9/06* (2013.01); *H04L 9/3236* (2013.01); *G06F 2212/1052* (2013.01); *H04L 2209/12* (2013.01)

(56) References Cited

U.S. PATENT DOCUMENTS

| | | | |
|---|---|---|---|
| 9,432,181 B2* | 8/2016 | Minematsu | H04L 9/0631 |
| 10,164,770 B1* | 12/2018 | Lee | G06F 21/80 |
| 10,474,589 B1* | 11/2019 | Raskin | H04L 63/10 |
| 2003/0120684 A1* | 6/2003 | Zuili | H04L 63/08 |
| 2012/0297110 A1* | 11/2012 | Kavi | G06F 12/1408 711/3 |
| 2015/0169472 A1* | 6/2015 | Yap | G06F 12/1408 713/190 |
| 2016/0182223 A1* | 6/2016 | Kishinevsky | G06F 21/85 380/28 |
| 2016/0371199 A1* | 12/2016 | Durham | G06F 21/72 |
| 2017/0171194 A1* | 6/2017 | Durham | H04L 9/3234 |
| 2017/0177504 A1* | 6/2017 | Desai | G09C 1/00 |
| 2017/0285976 A1* | 10/2017 | Durham | G06F 12/1408 |
| 2018/0046823 A1* | 2/2018 | Durham | H04L 9/3236 |
| 2018/0074975 A1* | 3/2018 | Deutsch | G06F 21/72 |
| 2018/0095812 A1* | 4/2018 | Deutsch | H04L 9/14 |
| 2019/0042734 A1* | 2/2019 | Kounavis | H04L 9/3239 |
| 2019/0068358 A1* | 2/2019 | Gutschow | H04L 9/14 |
| 2019/0102577 A1* | 4/2019 | Gueron | G06F 21/75 |
| 2019/0166158 A1* | 5/2019 | Grocutt | G06F 9/3844 |
| 2019/0347213 A1* | 11/2019 | Lutz | G06F 21/602 |

OTHER PUBLICATIONS

Gretton-Dann, Matthew, Arm A-Profile Architecture Developments 2018:Armv8.5-A, ARM Community https://community.arm.com/processors/b/blog/posts/arm-a-profile-architecture-2018-developments-armv85a, date unknown, 6 pages.

Watson et al., Capability Hardware Enhanced RISC Instructions (CHERI): Notes on the Meltdown and Spectre Attacks, University of Campbridge Computer Laboratory, Feb. 2018, 16 pages.

Watson et al., Cheri: A Hybrid Capability-System Architecture for Scalable Software Compartmentalization, 2015 IEEE Symposium on Security and Privacy, IEEE Computer Society, 2015, 18 pages.

Abadi et al., Control-Flow Integrity Principles, Implementations, and Applications, in Proceedings of the 12th ACM Conference on Computer and Communications Security, New York, NY, USA, 2005, pp. 340-353, 41 pages.

Author Unknown, Hardening Allocators with ADI, Barely Grasping the Small Picture blog, https://lazytyped.blogspot.it/2016/12/hardening-allocators-with-adi.html, Dec. 22, 2016, 4 pages.

Duck et al., Heap Bounds Protection with Low Fat Pointers, Proceedings of the 25th International Conference on Compiler Construction, Mar. 17-18, 2016, pp. 132-142,11 pages.

Author Unknown, libc:malloc meets ADIHEAP, Barely Grasping the Small Picture blog, https://lazytyped.blogspot.com/2018/02/libcmalloc-meets-adiheap.html, Feb. 25, 2018, 5 pages.

Kwon et al., Low-fat Pointers: Compact Encoding and Efficient Gate-level Implementation of Fat Pointers for Spatial Safety and Capability-based Security, Proceedings of the 2013 ACM SIGSAC Conference on Computer & Communications Security, New York, NY, USA, Nov. 2013, pp. 721-732, 13 pages.

Duck et al., Stack Bounds Protection with Low Fat Pointers, Proceedings of NDSS 2017, Feb. 26-Mar. 1, 2017, 15 pages.

Author Unknown, Pointer Authentication on ARMv8.3, Qualcomm Product Security, Qualcomm Technologies, Inc. Jan. 2017, 12 pages.

Kocher, Paul, et al., Spectre Attacks: Exploiting Speculative Execution, 40th IEEE Symposium on Security and Privacy (S&P'19)2018, 19 pages.

Lipp, Moritz et. al., Meltdown, 27th {USENIX} Security Symposium ({USENIX} Security 18), 2018, 16 pages.

\* cited by examiner

MEMORY TAGGING FOR SIDE-CHANNEL DEFENSE, MEMORY SAFETY, AND SANDBOXING

TECHNICAL FIELD

The present disclosure relates to computing system security, in particular relates to securing memory from side-channel, bounds bypass and use-after free attacks.

BACKGROUND

"Spectre" induces a system to speculatively perform operations that would not occur during correct program execution and which leak private, confidential, and/or secret information. "Meltdown" breaks all of the assumptions inherent in address space isolation and exploits out-of-order execution to read arbitrary kernel memory locations that may include private, confidential, and/or secret information. Both Spectre and Meltdown communicate the illicitly obtained private, confidential, and/or secret information to an adversary via a side-channel. Operating system (OS) and central processing unit (CPU) microcode patch-based mitigations for speculative execution based vulnerabilities such as Spectre and Meltdown have either been difficult to roll out in scale, require application recompilation, and/or introduce performance penalties, particularly for server workloads.

Existing and potential hardware and software architectures manifest additional security vulnerabilities. For example, some architectures may be susceptible to memory pointers being overwritten. As another example, some architectures may be susceptible to memory pointers manipulation (value added) that cause the pointers to land on a wrong (unauthorized) data object, either in space or in time. As another example, some architectures may be limited in the granularity for which they provide protection. What is needed is a technical solution to these security vulnerabilities.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

Although the following Detailed Description will proceed with reference being made to illustrative embodiments, many alternatives, modifications and variations thereof will be apparent to those skilled in the art.

DETAILED DESCRIPTION

Described herein are systems and methods for using memory tagging for side-channel defense, memory safety, and sandboxing to reduce the likelihood of successful side-channel attacks and other exploits, in accordance with various embodiments. The disclosed system and methods include memory tagging circuitry that is configured to address existing and potential hardware and software architectures security vulnerabilities, according to various embodiments. The memory tagging circuitry may be configured to prevent memory pointers being overwritten, prevent memory pointer manipulation (e.g., by adding values) that cause the pointers to land on a wrong (unauthorized) data object in memory space, access a non-current object in time and increase the granularity of memory tagging to include byte-level tagging in cache. The memory tagging circuitry may also be configured to sandbox untrusted code by tagging portions (e.g., words) of memory to indicate when the tagged portions of memory include contain a protected pointer. By co-locating meta-data with the same cacheline as its associated data so that it is immediately available for enforcement, memory tagging circuitry provides security features while enabling CPUs to continue using and benefiting from performing speculative operations in a cache coherent manner.

Figure 1:
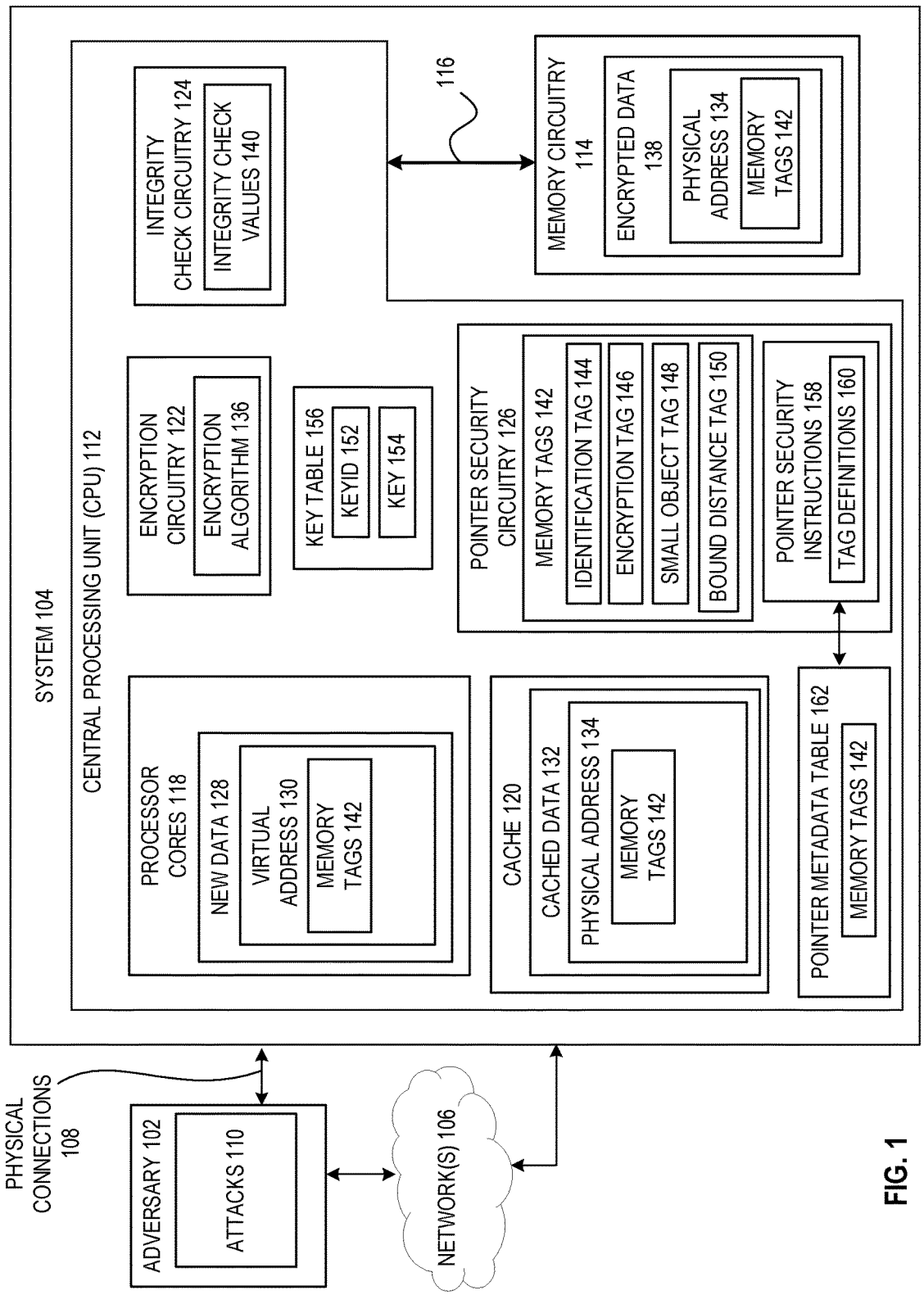
FIG. 1 is a block diagram of a computing environment that reduces the likelihood of successful side-channel attacks within a central processing unit (CPU) by providing address-based security features for memory within the CPU, in accordance with at least one embodiment described herein.

FIG. 1 is a block diagram of a computing environment 100 that reduces the likelihood of successful side-channel attacks within a central processing unit (CPU) by providing address-based security features for memory within the CPU, consistent with embodiments of the present disclosure. The computing environment 100 reduces the likelihood of successful side-channel attacks and memory exploits, while concurrently enabling the CPU to perform and benefit from performing speculative operations, according to an embodiment. The computing environment 100 includes an adversary 102 coupled to a system 104 through one or more networks 106 or one or more physical connections 108, according to an embodiment. The adversary 102 may perform one or more memory exploits or side-channel attacks 110 on the system 104 through the networks 106 and/or through the physical connections 108. The system 104 may include one or more of a variety of computing devices, including, but not limited to, a personal computer, a server, a laptop, a tablet, a phablet, a smartphone, a motherboard with a chipset, or some other computing device, according to various embodiments. The system 104 is configured to protect a CPU against side-channel attacks using a variety of address-based security features that enable the CPU to safely operate while performing speculative operations.

The adversary 102 may be a computing system, a person, or a combination of the computing system and a person, which may attempt one or more memory exploits or side-channel attacks on and against the system 104. The adversary 102 may use one or more networks 106 to execute the exploits and side-channel attacks 110. The adversary 102 may also use one or more physical connections 108, such as a memory interpose, memory probes, or the like, to read, modify, and/or write to one or more memory addresses within the system 104 in order to physically attack the system. Some of the attacks 110 may include attempting to override a pointer, attempting to manipulate up pointer (e.g., add they value to pointer to cause the pointer to point to an unintended object or move beyond the object's bounds), use a freed pointer to access a new object, and the like.

The system 104 is configured to provide a variety of memory-based security features to protect against the attacks 110, according to an embodiment. The system 104 includes base central processing unit (CPU) 112 which is coupled to memory circuitry 114 through one or more communications channels 116, according to an embodiment. The CPU 112 includes processor cores 118, cache 120, encryption circuitry 122, and integrity check circuitry 124, according to an embodiment. The CPU 112 also includes pointer security circuitry 126 that is configured to expand memory tag capabilities, reduce or prevent pointer override attacks, reduce or prevent pointer manipulation, prevent the reuse of freed pointers and enable byte-granularity memory safety for the CPU 112, according to an embodiment.

The CPU 112 may include any number and/or combination of currently available and/or future developed single- or multi-core central processing units. In embodiments, the CPU 112 may include a general-purpose processor, such as a Core® i3, i5, i7, 2 Duo and Quad, Xeon®, Itanium®, Atom®, or Quark® microprocessor, available from Intel® (Intel Corporation, Santa Clara, Calif.). Alternatively, the CPU 112 may include one or more processors from another manufacturer or supplier, such as Advanced Micro Devices (AMD®, Inc.), ARM Holdings® Ltd, MIPS®, etc. The CPU 112 may include a special-purpose processor, such as, for example, a network or communication processor, compression engine, graphics processor, co-processor, embedded processor, or the like. The CPU 112 may be implemented as a single semiconductor package or as a combination of stacked or otherwise interconnected semiconductor packages and/or dies. The CPU 112 may be a part of and/or may be implemented on one or more substrates using any of a number of process technologies, such as, for example, BiCMOS, CMOS, or NMOS.

The memory circuitry 114 represents one or more of a variety of types of memory that may be used in the system 104, according to an embodiment. The memory circuitry 114 may be volatile memory, may be non-volatile memory, or may be a combination of volatile memory and non-volatile memory, according to an embodiment. The volatile memory may include various types of random access memory (RAM). The non-volatile memory may include NAND memory, 3D crosspoint (3DXP), phase-change memory (PCM), hard disk drives, and the like, according to an embodiment.

The CPU 112 uses a number of components to move data back and forth between the CPU 112 and the memory circuitry 114, according to an embodiment. For example, while operating one or more software programs or while executing various instructions, the processor cores 118 may generate new data 128. The processor cores 118 may use a virtual address (a.k.a. Linear Address or Logical Address) 130 the new data 128 to write the new data 128 to the cache 120 or to the memory circuitry 114 via a translated physical address 134. The new data 128 may be saved in the cache 120 as cache data 132, or may be added to existing cached data 132, according to an embodiment. The cached data 132 may have a physical address 134 including KeyIDs, tags or additional meta-data 142. The CPU 112 may be configured to use the encryption circuitry 122 and an encryption algorithm 136 to encrypt the new data 128 and/or the cached data 132 prior to saving the new data 128 and/or the cached data 132 to the memory circuitry 114, as encrypted data 138. The CPU 112 may also use the integrity check circuitry 124 to generate integrity check values (or Message Authentication Codes/MAC) 140 that are based on the new data 128, the translated virtual address 130, the tags 142 for selecting the cryptographic MAC Key 154, and/or the physical address 134, according to an embodiment. The CPU 112 writes the integrity check values 140 to the memory circuitry 114, to enable corruption detection for the encrypted data 138 (caused, for example, by decrypting the data with using the wrong key).

Figure 8:
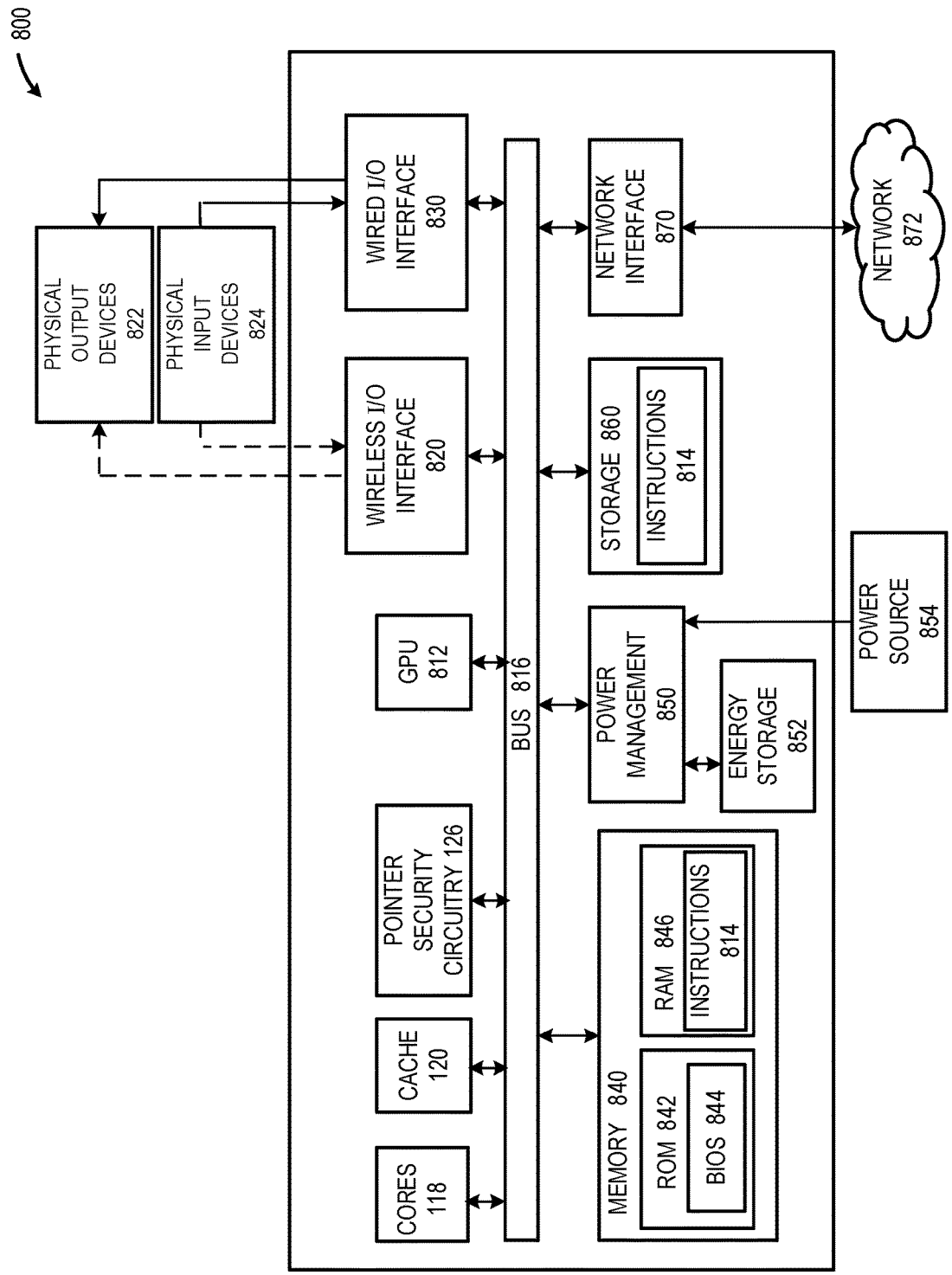
FIG. 8 is a block diagram of a system for using various memory tags to secure memory against side-channel attacks, in accordance with at least one embodiment described herein.

The CPU 112 may use the pointer security circuitry 126 to provide security for the data within the system 104. The pointer security circuitry 126 may be configured to detect when the virtual address 130 and/or the corresponding translated physical address 134 is being overridden, detect when the virtual address 130 and/or the physical address 134 has been manipulated, detect when the virtual address 130 and/or the physical address 134 has been used after being freed, provide byte-granularity memory safety through bounds checking, and provide definitions for use of memory tags, according to various embodiments disclosed herein. FIG. 1 and FIG. 8 illustrate example hardware configurations that may be used to support the security features provided by the pointer security circuitry 126. FIGS. 2, 3A, 3B, 4, 5, and 6 illustrate various example memory tag configurations that may be identified, defined, and/or applied by the pointer security circuitry 126 to secure the system 104 from the attacks 110, according to various embodiments.

When the processor cores 118 assign (e.g., by executing a software program) the virtual address 130 to the new data 128, the pointer security circuitry 126 may define, insert, or identify one or more memory tags 142 in the virtual address 130, to associate with the new data 128 to reduce the likelihood of a successful attack. The one or more memory tags 142 may include an identification tag 144, an encryption tag 146, a small object tag or indicator 148, and/or a bound distance tag 150.

The virtual address 130 for the new data 128 may include the identification tag 144 to provide security for the new data 128. The identification tag 144 may be colloquially referred to as a color, a cryptographic color, a memory color, a tag color, and the like. The identification tag 144 may include one or more bits of the virtual address 130. The pointer security circuitry 126 may be configured to define where within the virtual address 130 the identification tag 144 resides or is defined. For example, the pointer security circuitry 126 may define the identification tag 144 as the 8 most significant bits in the virtual address 130. The identification tag 144 may be defined as, for example, bits 56-62 (i.e., 7 bits) of bits 0-63 of the virtual address 130, assuming, as an example, that the length of the virtual address 130 is 64 bits. The pointer security circuitry 126 may use the identification tag 144 in a variety of ways to provide security to the new data 128. For example, the pointer security circuitry 126 may use the identification tag 144 as a tweak or as part of a tweak in the encryption algorithm 136. In one embodiment, the identification tag 144 is combined with a subset of the virtual address 130 translated to the physical address 134 to define a tweak that may be used by the encryption algorithm 136 when encrypting the new data 128, according to an embodiment. Alternatively, the identification tag 144 may be used as a key identifier (KeyID) 152 used to select the cryptographic key 154 used for encryption and/or integrity.

The physical address 134 for the new data 128 may include the encryption tag 146 to provide security for the new data 128. The encryption tag 146 may include one or more bits of the physical address 134. The pointer security circuitry 126 may be configured to define where within the physical address 134 the encryption tag 146 resides or is defined. For example, the pointer security circuitry 126 may define the encryption tag 146 as the 3 most significant bits in the physical address 134. The encryption tag 146 may be defined as, for example, bits 59-62 (i.e., 3 bits) of bits 0-63 of the physical address 134, assuming, as an example, that the length of the physical address 134 is 64 bits. The physical address may also be smaller than the virtual address, such as 56 bits in size. The encryption tag 146 may be a representation of a key ID 152 that is used to look up the encryption key 154 within a key table 156, by the encryption circuitry 122, according to an embodiment. The encryption tag 146 may also or alternatively be identified using other techniques, e.g., may be defined within one or more bits in the physical address 134. The encryption tag may be assigned by the processor based on which VM is executing on a core or thread in a multi-tenant system, or may be determined by the translation of a virtual address into a physical address via the page tables or extended page tables (EPTs) utilized by a memory management unit to populate virtual to physical address translations via translation lookaside buffers (TLB) 210.

The virtual address 130 for the new data 128 may include the small object tag (or small object indicator bit) 148 to provide security for the new data 128. The small object tag 148 may include one or more bits of the virtual address 130. The pointer security circuitry 126 may be configured to define where within the virtual address 130 the small object tag 148 resides or is defined. For example, the pointer security circuitry 126 may define the small object tag 148 as the most significant bit in the virtual address 130. As described in more detail below in association with FIGS. 3A and 3B, the pointer security circuitry 126 may use the small object tag 148 to provide byte-level pairings of memory tags of sub-cacheline objects stored within the same cacheline. For example, if the small object tag 148 is set (e.g., to "1"), the pointer security circuitry 126 may be configured to associate a number of identification tags within a single cacheline so that each of a number of subsets of data objects within that cacheline are assigned their own "color tag" or identification tag, according to an embodiment.

The virtual address 130 for the new data 128 may include the bound distance tag 150 to provide bounds security for the new data 128. The bound distance tag 150 and its associated features may be used as an alternative to the small object tag 148. The bound distance tag 150 may include one or more bits of the virtual address 130. The pointer security circuitry 126 may be configured to define where within the virtual address 130 the bound distance tag 150 resides or is defined. For example, the pointer security circuitry 126 may define the bound distance tag 150 as bits 51-57 of bits 0-63 of the virtual address 130. In one embodiment, the bound distance tag 150 includes bits 51-57 of bits 0-63 of the virtual address 130, and the identification tag 144 (the color) includes bits 58-63 (most significant 6 bits) of the virtual address 130, as an example.

The pointer security circuitry 126 may use the bound distance tag 152 to indicate how far outside of an object a memory address (i.e., a pointer) has strayed. The bound distance tag 152 may represent a signed number that represents a pointer that is either above or below the bounds of an original object that the memory address identified. The pointer security circuitry 126 may use the bound distance tag 152 to detect when the adversary 102 has modified a memory address (of a pointer) to redirect the memory address into a different object having the same identification tag as the object to which the memory address is actually authorized to point.

The pointer security circuitry 126 may also include pointer security instructions 158 that at least partially provide tag definitions 160. The pointer security instructions 158 may include a number of instructions or operations that may be used by the pointer security circuitry 126 or the CPU 112 to add a pointer in accordance with the tag definitions 160. The tag definitions 160 may define one or more of the length, location, and use of one or more of the identification tag 144, the encryption tag 146, the small object tag 148, and/or the bound distance tag 150.

The pointer security circuitry 126 may use a pointer metadata table 162 to store, update, and retrieve the memory tags 142 and/or the tag definitions 160, according to one embodiment. The pointer metadata table 162 may be used as an alternative to small object meta data that is stored on the same cacheline as its associated data, so that the small object meta data may be processed at the same time as the data and thus avoid speculation based attacks. A separate table requires additional memory lookup operations which may either expose the solution to side-channel attack or reduce system performance as both memory lookups needs to complete (both the metadata table lookup and the data lookup).

When the CPU 112 writes the data 132 for the physical address 134 location, the pointer security circuitry 126 may define, insert, or identify one or more memory tags 142 in the physical address 134, to associate with the cached data 132 to reduce the likelihood of a successful side-channel attack. The one or more memory tags 142 embedded within the physical address 134 may include one or more of the identification tag 144, the encryption tag 146, the small object tag 148, and/or the bound distance tag 150. The physical address 134 may include fewer, more, translated or different ones of the memory tags 142 than are used or associated with the virtual address 130, according to an embodiment.

As described above, as further described below, and as illustrated in FIGS. 2-7, the pointer security circuitry 126 may be configured to use the one or more memory tags 142 from the virtual address of the new data 128, from the cached data 132 and physical address, and from the encrypted data 138 to identify data corruption, memory address corruption, address manipulation, use after free, or otherwise unauthorized changes to address pointers within the CPU 112.

Figure 2:
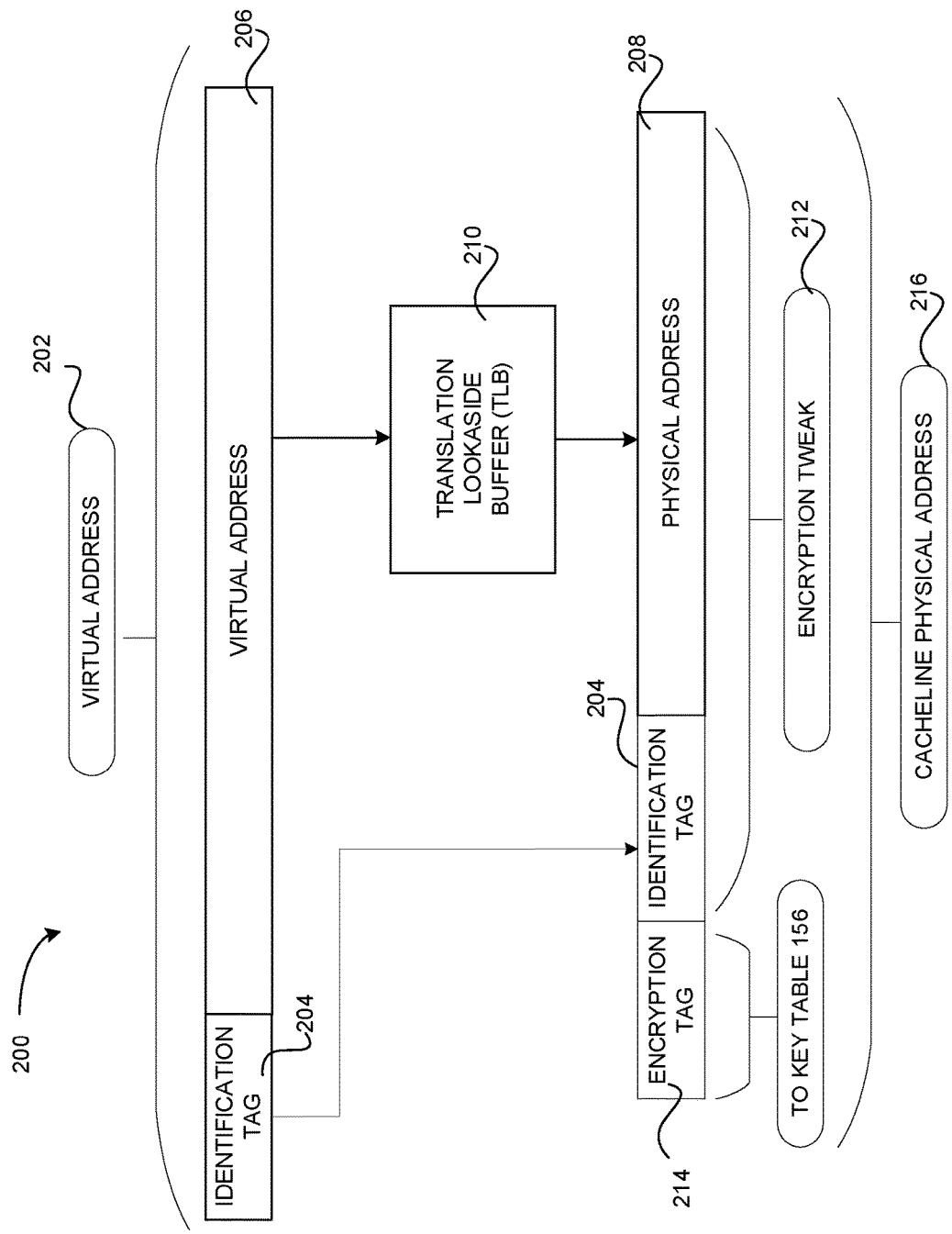
FIG. 2 is a diagram of an implementation of memory tags that may be used to secure memory address pointers against side-channel attacks, in accordance with at least one embodiment described herein.

FIG. 2 illustrates a memory address translation diagram 200 of an implementation of memory tags that may be used to secure memory address pointers against attacks, according to an embodiment. The memory address translation diagram 200 illustrates a virtual address 202 that includes an identification tag 204 that occupies one or more otherwise unused address bits (e.g., non-canonical address bits) and a virtual address 206 for locating data that occupies a subset of the virtual address 202, according to an embodiment. The virtual address 202 may be 64 bits. The identification tag 204 may occupy one or more most significant bits, or other bits within the virtual address 202. According to an embodiment. The virtual address 206 is translated into a physical address 208 through a translation lookaside buffer (TLB) 210, according to an embodiment. The identification tag 204 is appended to the physical address 208, according to an embodiment, or otherwise translated and then appended to the physical address 208. The physical address 208 memory location and the identification tag 204 may be combined to form or define an encryption tweak 212. An encryption tag 214 may be appended to the identification tag 204 and the physical address 208 to identify one or more encryption keys through the key table 156 (shown in FIG. 1), according to an embodiment. The processor may select the encryption tag based on what Virtual Machine (VM) or other context is currently executing on a processor thread, or else determine the encryption tag from a page table walk and the resulting TLB. The identification tag 204, the physical address 208, and the encryption tag 214 may be combined to define a cacheline physical address 216, according to an embodiment. In another embodiment, the identification tag 204 and the encryption tag 214 may together represent a KeyID 152 for selecting a cryptographic key 154 from the key table 156.

Employing the memory tag architecture that is illustrated in the memory address translation diagram 200, within the virtual address 202 and the physical address 216, may enable the system 104 and/or the central processing unit 112 (shown in FIG. 1) to increase the size of identification tags 204 to increase the difficulty of an adversary in guessing which memory tag (e.g., identification tag 204 and/or encryption tag 214) that is associated with a particular memory address pointer and/or a particular object, according to an embodiment. Guessing the wrong tag results in unintelligible encrypted ciphertext of the data that prevents data disclosure from side-channel analysis as speculative execution which operate on the ciphertext and not properly decrypted data in an embodiment.

Figure 3A:
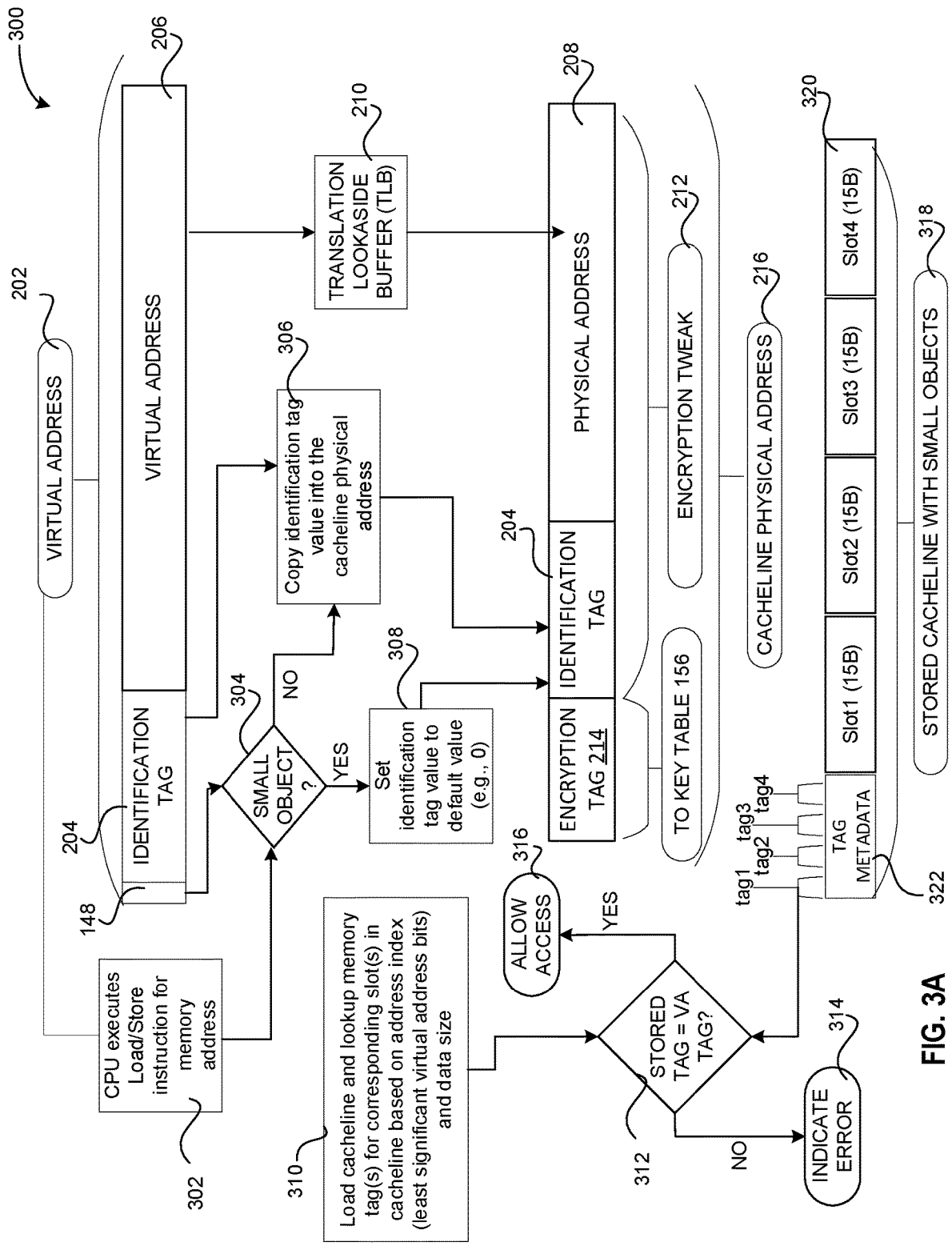
FIGS. 3A and 3B are flow diagrams of methods for securing memory address pointers against side-channel attacks, in accordance with at least one embodiment described herein.
Figure 3B:
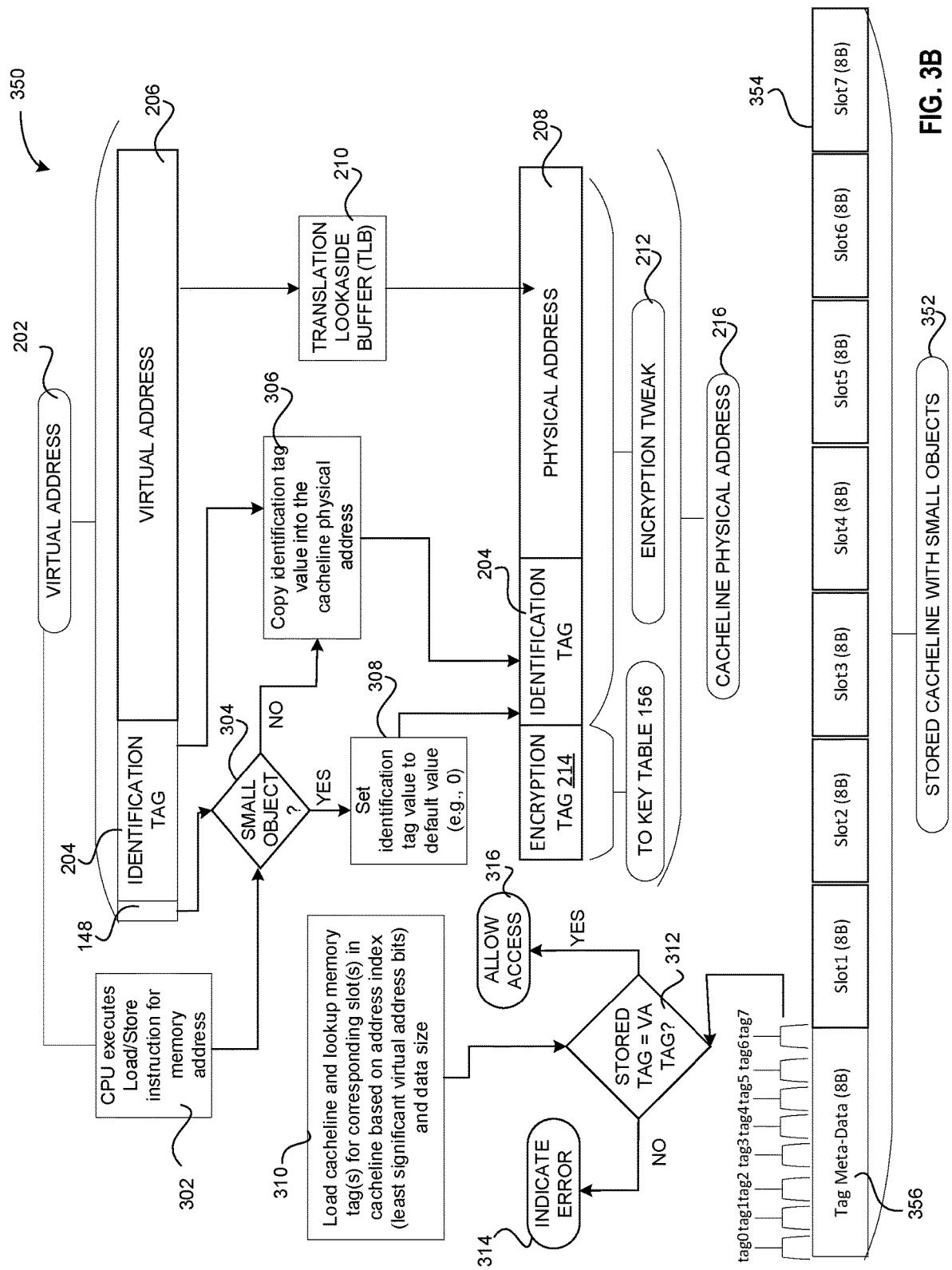

FIGS. 3A and 3B illustrate methods of using memory tags to secure memory address pointers against attacks, consistent with embodiments of the disclosure.

FIG. 3A illustrates a flow diagram of a method 300 for securing memory address pointers against attacks, according to an embodiment. The method 300 also determines whether to allow access to a cacheline based on a comparison of memory tags. The virtual address 202 may include a small object tag 148 indicator, in addition to the identification tag 204 and the virtual address 206, according to an embodiment.

At operation 302, a CPU executes a load/store instruction for a virtual memory address that includes the identification tag and small object indicator, according to an embodiment. Operation 302 proceeds to operation 304, according to an embodiment.

At operation 304, the method 300 determines whether the small object tag 148 indicator has been set, according to an embodiment. The method 300 determines whether the small object tag 148 has been set by reading one or more bits allocated for use by memory tags from the virtual address 202, according to an embodiment. If the small object tag 148 indicator is not set, operation 304 proceeds to operation 306, according to an embodiment. If the small object tag 148 is set, operation 304 proceeds to operation 308, according to an embodiment.

At operation 306, the method 300 copies the identification tag value into the cacheline physical address 216 to at least partially define the encryption tweak 212, or alternatively select a cryptographic key, according to an embodiment. In this way, objects the size of a cacheline (e.g. 64 bytes) or larger may rely on cryptography to determine if the identification tag cryptographically matches the corresponding data stored in memory. When reading memory, if the identification tag corresponds to the same encryption tweak (e.g. using XTS mode, XEX-based tweaked-codebook mode with ciphertext stealing) originally used to encrypt the data in memory, then the same identification tag will result in the corresponding tweak value used to properly decrypt the memory contents and/or verify its integrity using a MAC. If the wrong identification tag were used, then the memory contents will not decrypt properly and/or the memory integrity check (MAC) will fail resulting in a memory read integrity error (e.g. a poisoned cacheline). Thus, the incorrect identification tag will result in corrupt data and/or detection via integrity failure.

At operation 308, the method 300 sets the identification tag value to a default value, such as 0, to at least partially define the encryption tweak 212, or otherwise selects a default cryptographic key or tweak, according to an embodiment, that is used for all small objects within the same context. This is because small objects that fit within a cacheline may rely on meta-data tags also embedded in the same cacheline to determine if the correct identification tag in the virtual address was used to access the corresponding small object. The actual value of this default value may be configurable, may be kept secret, and may consist of a value that cannot be selected by a large object identifier tag preventing large object tags from being able to access small object assigned memory. This would limit setting object meta data to privileged code or to special processor instructions that can set the default value identification tag for small objects in the physical address.

At operation 310, the method 300 loads a cacheline and looks up memory tags for corresponding slots in the cacheline, based on an address index (e.g., the least significant virtual address bits) and the data size (indicating the number of tags that need to be checked for the memory access), according to an embodiment. The operation 310 may be performed after operation 302, speculatively before operation 302, or concurrently with operation 302, according to an embodiment. In all cases, the tag meta-data is available to the processor with the corresponding small object data residing on the same cacheline, and, thus, does not require a separate memory load and cache line fill. Operation 310 proceeds to operation 312, according to an embodiment.

At operation 312, the method 300 determines if a stored tag or tags for a small object occupying one or more contiguous slots within a cacheline matches a virtual address identification tag, according to an embodiment. The meta-data tags in the cacheline are compared with the identification tag (e.g., "color" tags) in the virtual address, according to an embodiment. If the tags do not match (are not equal), operation 312 proceeds to operation 314 where the method 300 indicates an error has occurred, according to an embodiment. If the tags match, operation 312 proceeds to operation 316, where the method 300 allows access to the memory address associated with the loaded cacheline, according to an embodiment. Notably, the small object size allows the object data and the corresponding meta-data tags to occupy the same cacheline allowing the processor to immediately access the tag data and make an access control decision. Contrast this to speculation which may speculatively proceed with the data access while waiting for separate memory loads of meta-data tags to complete, resulting in either side-channels due to speculation or reduced performance while the processor waits for the separate meta-data load to complete. By co-locating the small object tag meta-data with the small object data on the same cacheline, speculative execution is unnecessary as all the necessary data is present simultaneously in-order for the processor to make an access control decision without reducing performance.

At operation 310, the method 300 loads a stored cacheline with small objects 318 which may comprise a number of slots 320, which are subsets of the cacheline. One of the slots 320 of the stored cacheline with small objects 318 may include tag metadata 322, according to an embodiment. The tag metadata 322 may include a tag (e.g., a 1 byte identification tag) for each of the slots 320 of the stored cacheline with small objects 318, according to an embodiment. The tag metadata 322 provides sub-cacheline granularity to assign memory tags with memory address pointers or with objects, to reduce the likelihood of successful attacks.

FIG. 3B illustrates a flow diagram of a method 350 for securing memory address pointers against attacks, according to an embodiment. The method 350 also determines whether to allow access to a cacheline based on a comparison of memory tags. The method 350 is similar to the method 300 (shown in FIG. 3B) except that the method 350 loads a stored cacheline with small objects 352 that includes a plurality of slots 354 that have a finer granularity than the slots 320, according to an embodiment. The slots 354 are each 8 bytes in size, while the slots 320 are each 15 bytes in size, according to an embodiment. FIGS. 3A and 3B illustrate that memory tags and tag metadata of various sizes, positions and formats may be used to provide memory tagging security with sub-cacheline granularity, according to an embodiment. The stored cacheline with small objects 352 includes a slot 356 for tag metadata that is associated with 7 slots, according to an embodiment. The slots 356 may include an additional byte or bits of metadata that may be used to support additional memory tagging functionality, according to an embodiment. There is an extra byte tag for the first slot, that can be used to access control the first slot containing the 8 bytes of meta data (tags), for example, limiting access to the memory allocation routines that know the correct identification tag to access the meta-data slot. Virtual addresses corresponding to the first slot may be binary bx . . . x000xxx, second slot bx . . . x001xxx, third bx . . . x010xxx, fourth bx . . . x011xxx, etc. In other words, those three address bits third from the least significant address bit determine which meta data tag to use based on which slot(s) is being accessed by the memory reference. The extent of the slots that a data access comprises is determined by the instruction or operation being executed by the processor. For example, moving contents from memory to a 64 bit general purpose register in the processor may comprise one 8 byte slot, requiring the checking of the one corresponding meta-data tag, whereas loading a 128 bit XMM register may require checking the tags corresponding two contiguous slots occupied by the 128 bit SSE data in memory.

Figure 4:
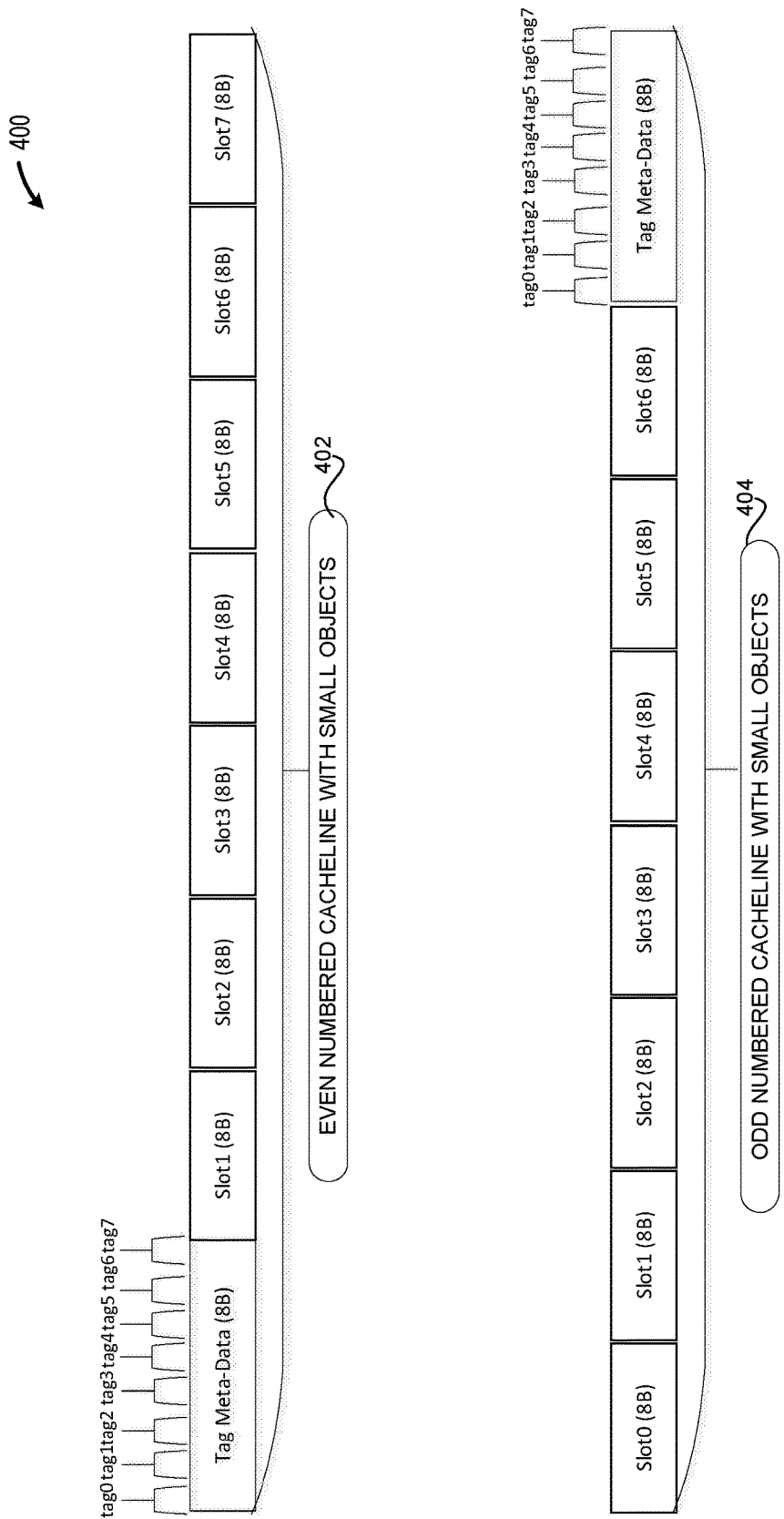
FIG. 4 is a block diagram of different tag metadata configurations for cachelines, in accordance with at least one embodiment described herein.

FIG. 4 illustrates a block diagram 400 of different tag metadata configurations for cachelines, according to an embodiment. The block diagram 400 includes an even numbered cacheline with small objects 402 and an odd numbered cacheline with small objects 404. In one implementation of tag metadata in cachelines, even numbered cachelines are configured to store a tag metadata in the most significant bits of the cacheline and odd numbered cachelines are configured to store tag metadata in the least significant bits of the cacheline. In one implementation, even numbered cachelines are configured to store tag metadata in the least significant bits of the cacheline and odd numbered cachelines are configured to store tag metadata in the most significant bits of the cacheline. Other slots of the cachelines may be used to store tag metadata, according to various embodiments. This format for meta-data allows small objects to cross cacheline boundaries in a contiguous fashion, thus allowing incrementing pointers (virtual addresses) to access the full extent of small objects that may be larger than a single cacheline. For example, arrays in C or C++ languages are accessed by incrementing the array pointer (virtual address) in a contiguous fashion, allowing the tag meta-data to be verified against the virtual address identification tag for each slot comprising the array. Meanwhile, memory allocations (e.g. object or array allocations) larger than two contiguous cachelines may utilize the cryptographic methods for large objects 306.

Software, such as glibc memory allocator library, is responsible for assigning identification tags and initializing memory. For example, when memory is first allocated via the malloc function for a certain size, the malloc function will determine if the size corresponds to a large object or small object. If the size is larger than a cacheline, the allocator will choose the large object identification tag, find an available region of contiguous memory, and use a non-temporal memory write (e.g. MOVNT) or the equivalent to initialize the memory, all the cachelines comprising the allocation size, with the current identification tag in the virtual address. It will then return the virtual address with this identification tag to the caller. Similarly, when freeing allocated memory via the free routine, the cache lines comprising the previously allocated data may be flushed from the cache, for example, using the CLFLUSH instruction with the previously allocated identification tag in the virtual address being flushed.

If, on the other hand, the size of the allocation is smaller than a cacheline, the malloc routine will instead identify a freed block of small object memory, set the meta-data tags to a value corresponding to the pointer's virtual address identification tag, and set the small object tag indicator bit in the pointer's virtual address to 1, returning this small object pointer to the caller. Malloc can access and set the tag meta-data by setting the virtual address to the default value while setting the small object tag indicator to 0 and then overwriting the tag's memory location, or alternatively, setting the small object indicator tag with the correct identification tag and memory location of the meta-data portion of the cacheline in the virtual address as illustrated in FIG. 3B. Similarly, when freeing allocated memory via the free routine, the memory manager may access the memory tag location for the size of the freed memory, setting the tag meta-data to another value to prevent use-after-free of the previous pointer identification tags, thus, preventing use-after-free exploits.

Figure 5:
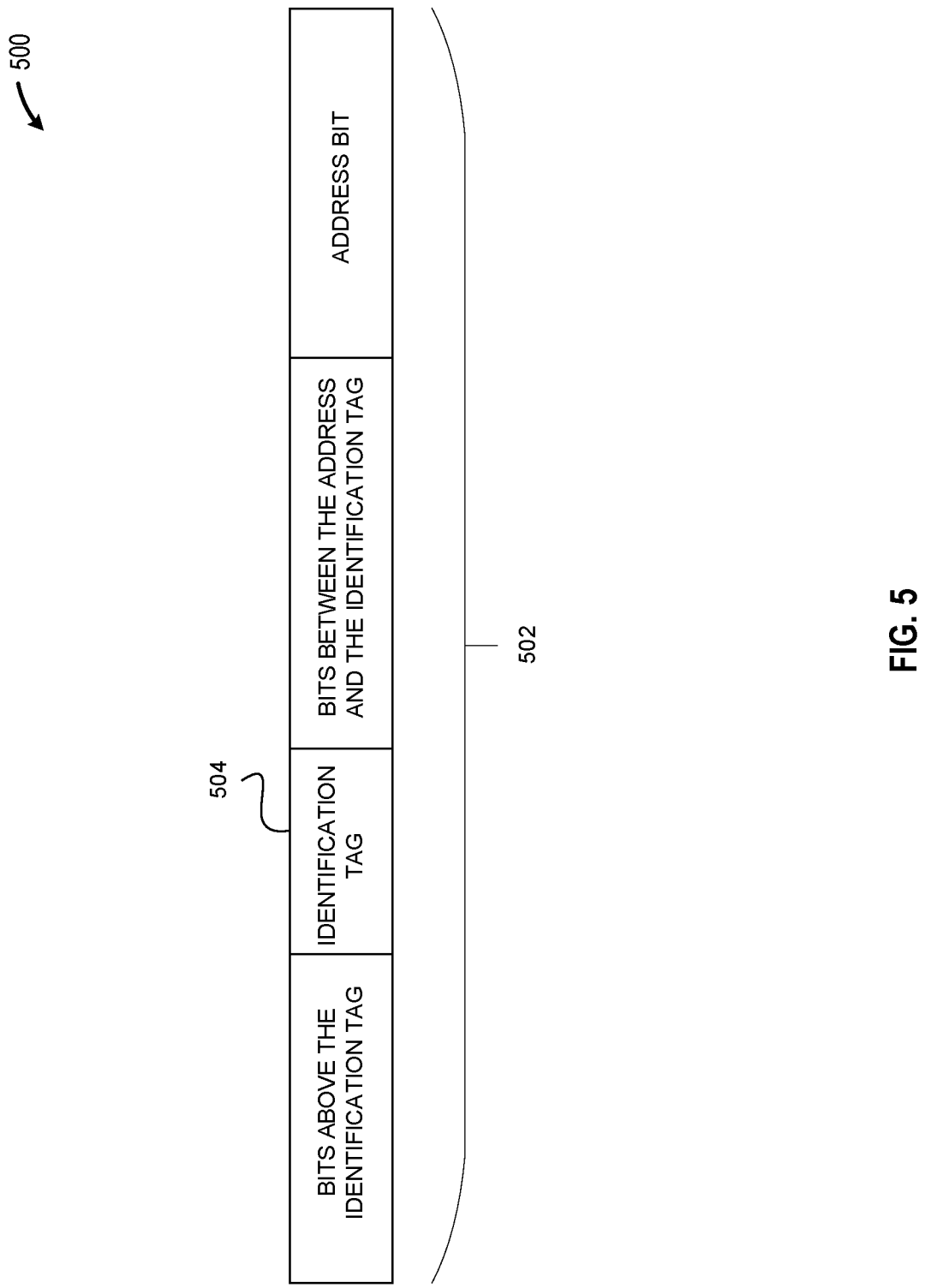
FIG. 5 is a block diagram of a virtual memory address that illustrates that an identification tag (e.g., a color tag) that may be stored in various locations within a virtual memory address, in accordance with at least one embodiment described herein.

FIG. 5 illustrates a block diagram 500 of a virtual memory address 502 that illustrates that an identification tag 504 (e.g., a color tag) may be stored in various locations within the virtual memory address. The identification tag 504 may occupy one or more bits within the virtual memory address 502 such that the virtual memory address 502 includes one or more bits above the identification tag 504 and one or more bits between the identification tag and the portion of the virtual memory address that is translated into the physical address (e.g., through a translation lookaside buffer).

Figure 6:
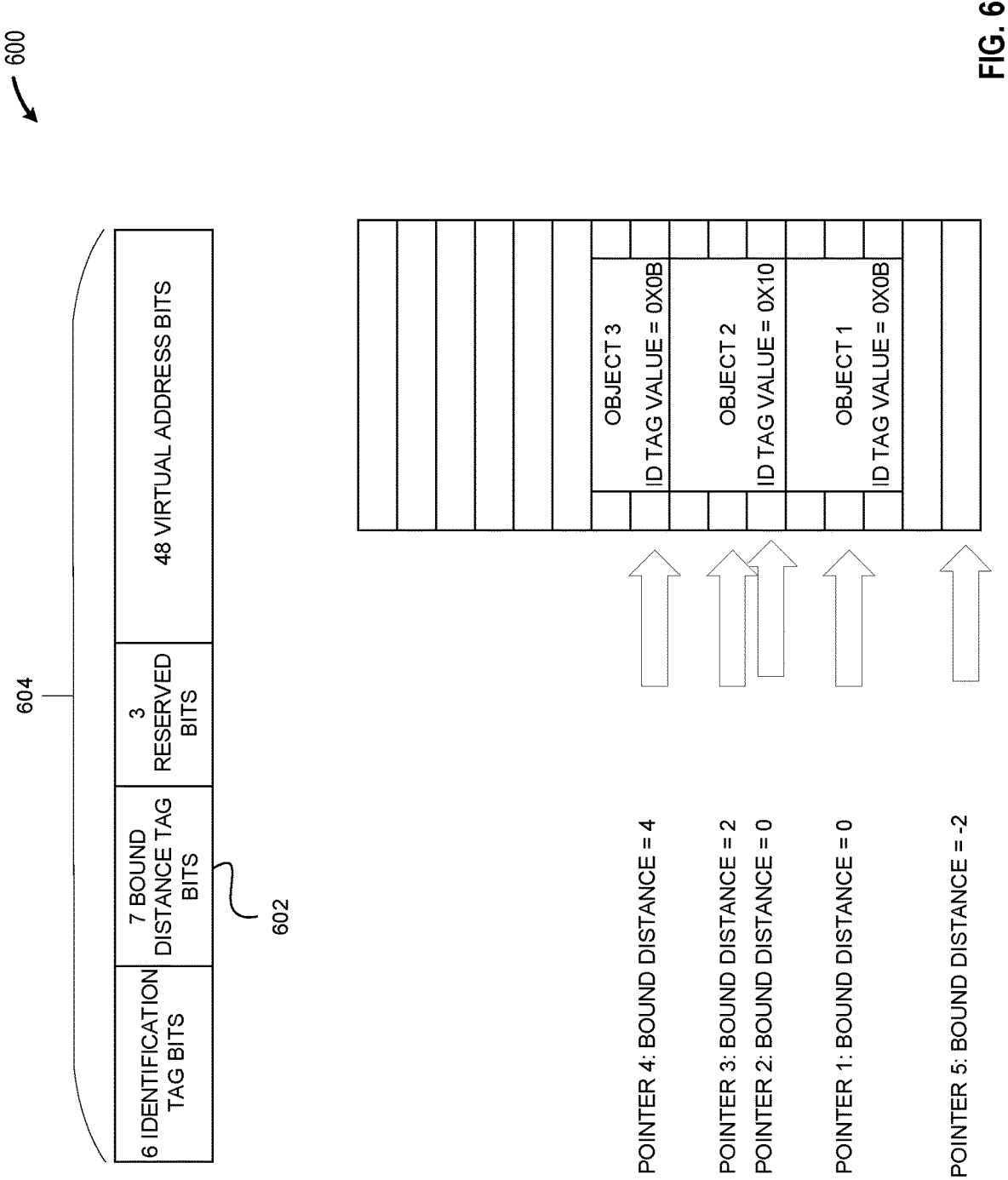
FIG. 6 is a block diagram that includes the use of bound distance bits to reduce the likelihood of success of side-channel attacks of a computing system, in accordance with at least one embodiment described herein.

FIG. 6 illustrates a block diagram 600 that includes the use of bound distance bits (e.g., the bound distance tag 150) to reduce the likelihood of successful side-channel attacks of a computing system, according to an embodiment. The diagram 600 includes bound distance bits 602 in a memory address pointer 604. The bound distance tag bits 602 are an example of a memory tag that may be used to detect potential security breaches of memory. The bound distance tag bits 602 may represent a signed number and may represent a pointer that is either above or below the bounds of the object to which the memory address pointer 604 is authorized to point.

Diagram 600 illustrates a plurality of example memory address pointers (e.g., pointers 1-5) that point to objects (e.g., objects 1-3) that are stored in memory (e.g., in a cacheline). Pointer 1 points to object 1, with a bound distance equal to 0, so pointer 1 references object 1. Pointer 5 initially points to object 1, but has a bound distance equal to −2, so that pointer 5 no longer references object 1. Pointer 3 has a bound distance equal to 2, pointer 4 has a bound distance equal to 4. Because pointer 1 and pointer 4 both point to objects (e.g., object 1 and object 3) that have a same identification tag value (e.g., 0x0B), using an identification tag alone (e.g., a color tag) may be insufficient to prevent unauthorized memory accesses by adding a value to a memory address pointer. The use of a bound distance tag provides bound distance information to enable, for example, the CPU 112 (shown in FIG. 1) to determine whether a memory address pointer is being manipulated to point to unauthorized objects.

The pointers 1 and 3-5 are derived from a pointer to object 1. Thus, the pointers that do not point into object 1 have non-zero bound distances. So, even if they happen to point into another same-tagged object (e.g., object 3), access attempts through them will fault. The pointer security circuitry may update the bound distance as it updates pointer values. The pointer security circuitry may retrieve the color of each cacheline to do this. For example, if color values are stored in a centralized metadata table in memory, then the pointer security instructions can read the color out of that table.

Looking up such information may introduce significant overhead, so it may be advantageous to cache the metadata. The register file can be extended to cache the bounds of the object into which the register points to minimize/reduce access latency. Such would be advantageous for pointers that are updated numerous times while loaded into a single register.

Even without additional caches or register extensions, the bound distance field within each pointer represents a sort of cache of bounds information, so the potential for inconsistencies when the underlying color assignments change are taken into account, according to an embodiment. For example, this may motivate re-computing the object bounds each time a pointer security circuitry update instruction is executed to support software operations such as realloc that may dynamically expand an object. If the current color of the cacheline at the current pointer value minus the current bound distance field (times the cacheline size) does not match the color specified in the pointer, then the pointer security circuitry update instruction should fault. Alternatively, another field could be added to the pointer indicating the distance in cachelines from the current pointer value to the original pointer value (i.e. the object base), which could enable re-computation of the object's bounds even if the object shrinks by making it possible to locate the object base from any pointer into that object.

By encoding the bound distance in 1's complement form, a check of the bound distance may be performed to check if the bound distance is 0 at the time of any attempted access using the existing canonicality check. When the bound distance is 0, the representation will be selected that will permit the canonicality check to pass (i.e. all 0's for user addresses, all 1's for supervisor addresses).

Some limited boundary crossings in pointer values are supported, since C programs sometimes set pointers up to a page beyond the base or bound of an object, but attempts to dereference such out-of-bounds pointers generate a fault. This motivates including a bound distance field rather than simply faulting in pointer security instructions as soon as a pointer strays outside of its associated object bounds. Representing pointers up to a page outside of their associated objects is what determined the size of the bound distance field, since the maximum bound distance magnitude of 64 times the 64-byte cacheline size equals precisely one page.

Figure 7:
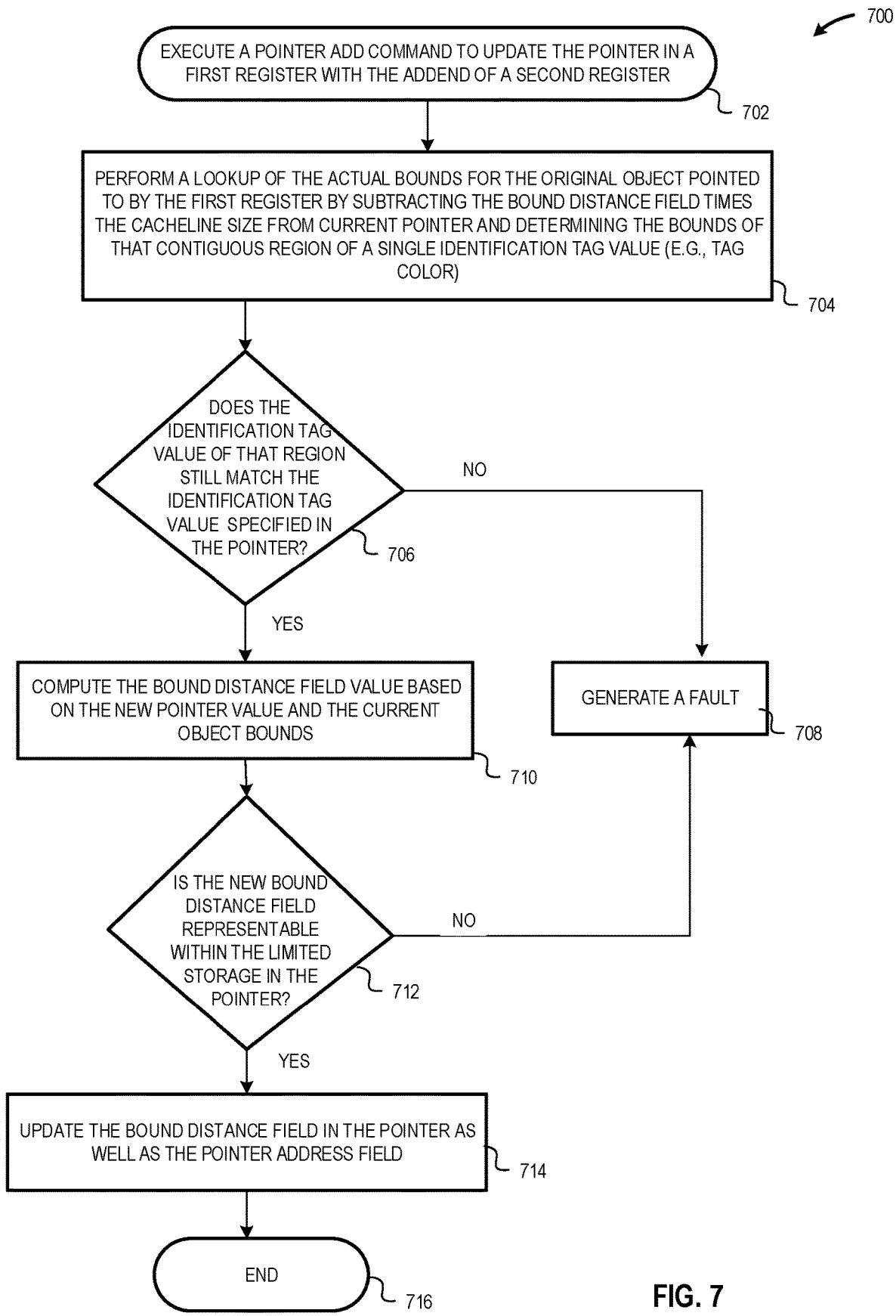
FIG. 7 is a flow diagram of a process for adding a pointer, in accordance with at least one embodiment described herein.

FIG. 7 illustrates an example flow diagram of a method 700 for adding a pointer, consistent with embodiments of the disclosure. The method 700 represents an example of the pointer security instructions 158 (shown in FIG. 1), according to an embodiment.

At operation 702, the method 700 executes a pointer add command to update a pointer in a first register with the addend in a second register, according to an embodiment.

At operation 704, the method 700 performs a lookup of the actual bounds for the original object pointed to by the first register by subtracting the bound distance field times the cacheline size from current pointer and determining the bounds of that contiguous region of a single identification tag value (e.g., tag color), according to an embodiment.

At operation 706, the method 700 determines if the identification tag value of that region still matches the identification tag value specified in the pointer, according to an embodiment. If the identification tag values do not match, operation 706 proceeds to operation 708, according to an embodiment. If the identification tag values match, operation 706 proceeds to operation 710, according to an embodiment.

At operation 708, the method 700 generates a fault, according to an embodiment.

At operation 710, the method 700 computes the bound distance field value based on the new pointer value and the current object bounds, according to an embodiment.

At operation 712, the method 700 determines if the new bound distance field is representable within the limited storage of the pointer, according to an embodiment. If the new bound distance is not representable within the limited storage in the pointer, operation 712 proceeds to operation 708 where the method 700 generates a fault. If the new bound distance is representable within the limited storage in the pointer, operation 712 proceeds to operation 714.

At operation 714, the method 700 updates the bound distance field in the pointer as well as the pointer address field, according to an embodiment.

At operation 716, the method 700 ends, according to an embodiment.

Two additional fields may be added to support byte-granular checks. The first could indicate the number of bytes at the beginning of the contiguous region with one color (e.g., identification tag) that may be inaccessible and the second could indicate the size of the inaccessible band at the end of the contiguous region (referred to hereafter as "exclusion bands"). Each field may be defined to be large enough to represent the number of bytes in a cacheline minus one, i.e. six bits for 64-byte cachelines. These checks can either be done inline with memory accesses or using separate instructions that precede memory accesses.

This scheme may be sufficient to support byte-granularity checks for a whole object or fields within a small object, rather than individual fields within a large object, since the bounds of those individual fields may be further than a single cacheline from the bounds of the region of a contiguous color. Such fine-grained sub-bounds could be supported by expanding the fields specifying the exclusion bands. Encoding schemes such as those in low-fat pointers could also be used to balance storage overhead, granularity, and the reach of exclusion bands.

FIG. 8 is a schematic diagram of an illustrative electronic, processor-based, device 800 that includes pointer security circuitry 126 configured to use various memory tags to secure memory against side-channel attacks, in accordance with at least one embodiment described herein. The processor-based device 800 may additionally include one or more of the following: processor cores 118, cache 120, a graphical processing unit 812, a wireless input/output (I/O) interface 820, a wired I/O interface 830, memory circuitry 840, power management circuitry 850, non-transitory storage device 860, and a network interface 870. The following discussion provides a brief, general description of the components forming the illustrative processor-based device 800. Example, non-limiting processor-based devices 800 may include: smartphones, wearable computers, portable computing devices, handheld computing devices, desktop computing devices, blade server devices, workstations, and similar.

In embodiments, the processor-based device 800 includes processor cores 118 capable of executing machine-readable instruction sets 814, reading data and/or instruction sets 814 from one or more storage devices 860 and writing data to the one or more storage devices 860. Those skilled in the relevant art will appreciate that the illustrated embodiments as well as other embodiments may be practiced with other processor-based device configurations, including portable electronic or handheld electronic devices, for instance smartphones, portable computers, wearable computers, consumer electronics, personal computers ("PCs"), network PCs, minicomputers, server blades, mainframe computers, and the like.

The processor cores 118 may include any number of hardwired or configurable circuits, some or all of which may include programmable and/or configurable combinations of electronic components, semiconductor devices, and/or logic elements that are disposed partially or wholly in a PC, server, or other computing system capable of executing processor-readable instructions.

The processor-based device 800 includes a bus or similar communications link 816 that communicably couples and facilitates the exchange of information and/or data between various system components including the processor cores 118, the cache 120, the graphics processor circuitry 812, one or more wireless I/O interfaces 820, one or more wired I/O interfaces 830, one or more storage devices 860, and/or one or more network interfaces 870. The processor-based device 800 may be referred to in the singular herein, but this is not intended to limit the embodiments to a single processor-based device 800, since in certain embodiments, there may be more than one processor-based device 800 that incorporates, includes, or contains any number of communicably coupled, collocated, or remote networked circuits or devices.

The processor cores 118 may include any number, type, or combination of currently available or future developed devices capable of executing machine-readable instruction sets. The processor cores 118 may include (or be coupled to) but are not limited to any current or future developed single- or multi-core processor or microprocessor, such as: on or more systems on a chip (SOCs); central processing units (CPUs); digital signal processors (DSPs); graphics processing units (GPUs); application-specific integrated circuits (ASICs), programmable logic units, field programmable gate arrays (FPGAs), and the like. Unless described otherwise, the construction and operation of the various blocks shown in FIG. 8 are of conventional design. Consequently, such blocks need not be described in further detail herein, as they will be understood by those skilled in the relevant art. The bus 816 that interconnects at least some of the components of the processor-based device 800 may employ any currently available or future developed serial or parallel bus structures or architectures.

The system memory 840 may include read-only memory ("ROM") 842 and random access memory ("RAM") 846. A portion of the ROM 842 may be used to store or otherwise retain a basic input/output system ("BIOS") 844. The BIOS 844 provides basic functionality to the processor-based device 800, for example by causing the processor cores 118 to load and/or execute one or more machine-readable instruction sets 814. In embodiments, at least some of the one or more machine-readable instruction sets 814 cause at least a portion of the processor cores 118 to provide, create, produce, transition, and/or function as a dedicated, specific, and particular machine, for example a word processing machine, a digital image acquisition machine, a media playing machine, a gaming system, a communications device, a smartphone, or similar.

The processor-based device 800 may include at least one wireless input/output (I/O) interface 820. The at least one wireless I/O interface 820 may be communicably coupled to one or more physical output devices 822 (tactile devices, video displays, audio output devices, hardcopy output devices, etc.). The at least one wireless I/O interface 820 may communicably couple to one or more physical input devices 824 (pointing devices, touchscreens, keyboards, tactile devices, etc.). The at least one wireless I/O interface 820 may include any currently available or future developed wireless I/O interface. Example wireless I/O interfaces include, but are not limited to: BLUETOOTH®, near field communication (NFC), and similar.

The processor-based device 800 may include one or more wired input/output (I/O) interfaces 830. The at least one wired I/O interface 830 may be communicably coupled to one or more physical output devices 822 (tactile devices, video displays, audio output devices, hardcopy output devices, etc.). The at least one wired I/O interface 830 may be communicably coupled to one or more physical input devices 824 (pointing devices, touchscreens, keyboards, tactile devices, etc.). The wired I/O interface 830 may include any currently available or future developed I/O interface. Example wired I/O interfaces include, but are not limited to: universal serial bus (USB), IEEE 1394 ("FireWire"), and similar.

The processor-based device 800 may include one or more communicably coupled, non-transitory, data storage devices 860. The data storage devices 860 may include one or more hard disk drives (HDDs) and/or one or more solid-state storage devices (SSDs). The one or more data storage devices 860 may include any current or future developed storage appliances, network storage devices, and/or systems.

Non-limiting examples of such data storage devices 860 may include, but are not limited to, any current or future developed non-transitory storage appliances or devices, such as one or more magnetic storage devices, one or more optical storage devices, one or more electro-resistive storage devices, one or more molecular storage devices, one or more quantum storage devices, or various combinations thereof. In some implementations, the one or more data storage devices 860 may include one or more removable storage devices, such as one or more flash drives, flash memories, flash storage units, or similar appliances or devices capable of communicable coupling to and decoupling from the processor-based device 800.

The one or more data storage devices 860 may include interfaces or controllers (not shown) communicatively coupling the respective storage device or system to the bus 816. The one or more data storage devices 860 may store, retain, or otherwise contain machine-readable instruction sets, data structures, program modules, data stores, databases, logical structures, and/or other data useful to the processor cores 118 and/or graphics processor circuitry 812 and/or one or more applications executed on or by the processor cores 118 and/or graphics processor circuitry 812. In some instances, one or more data storage devices 860 may be communicably coupled to the processor cores 118, for example via the bus 816 or via one or more wired communications interfaces 830 (e.g., Universal Serial Bus or USB); one or more wireless communications interfaces 820 (e.g., Bluetooth®, Near Field Communication or NFC); and/or one or more network interfaces 870 (IEEE 802.3 or Ethernet, IEEE 802.11, or WiFi®, etc.).

Processor-readable instruction sets 814 and other programs, applications, logic sets, and/or modules may be stored in whole or in part in the system memory 840. Such instruction sets 814 may be transferred, in whole or in part, from the one or more data storage devices 860. The instruction sets 814 may be loaded, stored, or otherwise retained in system memory 840, in whole or in part, during execution by the processor cores 118 and/or graphics processor circuitry 812.

The processor-based device 800 may include power management circuitry 850 that controls one or more operational aspects of the energy storage device 852. In embodiments, the energy storage device 852 may include one or more primary (i.e., non-rechargeable) or secondary (i.e., rechargeable) batteries or similar energy storage devices. In embodiments, the energy storage device 852 may include one or more supercapacitors or ultracapacitors. In embodiments, the power management circuitry 850 may alter, adjust, or control the flow of energy from an external power source 854 to the energy storage device 852 and/or to the processor-based device 800. The power source 854 may include, but is not limited to, a solar power system, a commercial electric grid, a portable generator, an external energy storage device, or any combination thereof.

For convenience, the processor cores 118, the graphics processor circuitry 812, the wireless I/O interface 820, the wired I/O interface 830, the storage device 860, and the network interface 870 are illustrated as communicatively coupled to each other via the bus 816, thereby providing connectivity between the above-described components. In alternative embodiments, the above-described components may be communicatively coupled in a different manner than illustrated in FIG. 8. For example, one or more of the above-described components may be directly coupled to other components, or may be coupled to each other, via one or more intermediary components (not shown). In another example, one or more of the above-described components may be integrated into the processor cores 118 and/or the graphics processor circuitry 812. In some embodiments, all or a portion of the bus 816 may be omitted and the components are coupled directly to each other using suitable wired or wireless connections.

Figure 9:
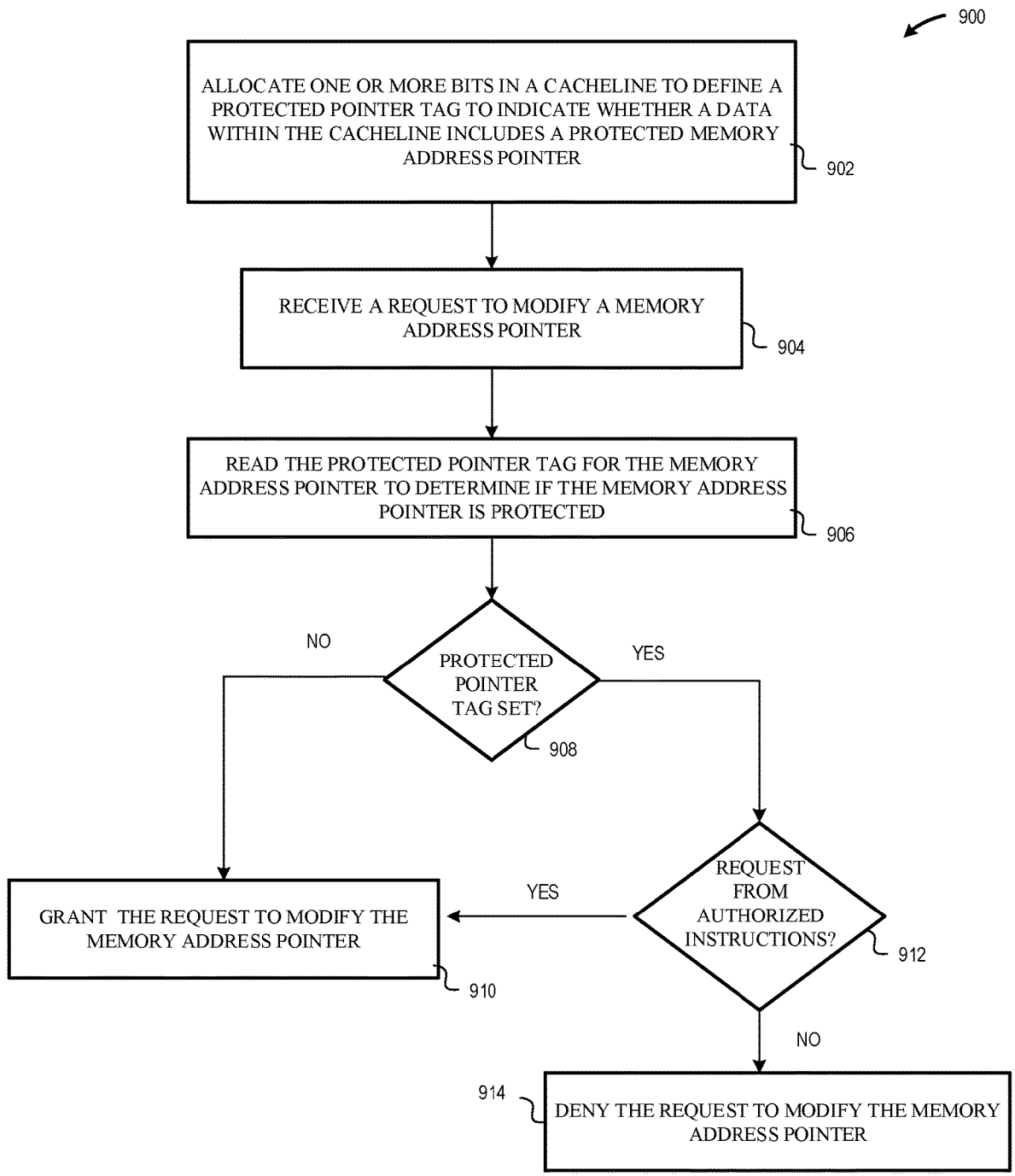
FIG. 9 is a flow diagram of a process for using memory tagging to provide an isolated environment "a sandbox" for untrusted software, in accordance with at least one embodiment described herein.

FIG. 9 illustrates a flow diagram of a method 900 for using memory tagging to provide an isolated environment "a sandbox" for untrusted software, consistent with embodiments of the present disclosure. The isolated environment may include hardware (e.g., the pointer security circuitry 126—shown in FIG. 1) and may include firmware, software, or other instructions (e.g., the pointer security instructions 158—shown in FIG. 1).

At operation 902, the method 900 allocates one or more bits in a cacheline to define a protected pointer tag to indicate whether data within the cacheline includes a protected memory address pointer, according to an embodiment. The data within the cacheline may be a word of data.

At operation 904, the method 900 receives a request to modify a memory address pointer, according to an embodiment.

At operation 906, the method 900 reads the protected pointer tag for the memory address pointer to determine if the memory address pointer is protected, according to an embodiment.

At operation 908, the method 900 determines whether the protected pointer tag is set, according to an embodiment. If the protected pointer tag is not set, operation 908 proceeds to operation 910. If the protected pointer tag is set, operation 908 proceeds to operation 912.

At operation 910, the method 900 grants the request to modify the memory address pointer, according to one embodiment.

At operation 912, the method 900 determines whether the request to modify the memory address pointer was made with authorized pointer security instructions. If the request was made with authorized pointer security instructions, operation 912 proceeds to operation 910, where the request is granted. If the request was not made with authorized pointer security instructions, operation 912 proceeds to operation 914, wherein the request is denied.

Embodiments of the disclosed technology may be used to sandbox untrusted software. Sandboxing untrusted code using hardware is equivalent to shrinking the trusted computing base (TCB) so that the compiler and program need not be trusted. This relies on hardware mechanisms (e.g., the pointer security circuitry 126) to prevent corruption of pointers, which can be accomplished by tagging words of memory so that a set tag bit indicates that the word contains a protected pointer. Alternatively, pointers can be stored in centralized, protected tables referenced indirectly by tokens, as in the Intel 432, or by pointer locations as in memory protection extensions (MPX). An advantage of tagging is that cache locality can be enhanced and the overheads associated with table lookups can be avoided. An alternative to memory tagging is to authenticate pointer data using a cryptographic MAC embedded in the pointer.

In one implementation, only authorized pointer security instructions are allowed to modify tagged pointers, and those instructions are designed to satisfy important security properties such as monotonicity: no pointer security instruction will update a pointer to grant broader/greater access than was granted by the original pointer. In addition to instructions that update the pointer value, pointer security instructions and/or pointer security circuitry may support instructions that update the object bounds. For example, such an instruction could accept as inputs an existing pointer and narrowed object bounds. The instruction would check that the proposed new bounds are indeed narrower than the original bounds of the object prior to generating the new capability.

Since object bounds are calculated using both inline metadata from pointers as well as color information (e.g., identification tags) from the memory hierarchy, it may be useful to prevent sandboxes from modifying the identification tags of memory to which they do not already have access. This rule can be satisfied/implemented by a trusted runtime not providing any pointers referencing memory using an unauthorized color specification. This prevents the untrusted software from using a write-for-ownership instruction (i.e. one that writes without first reading) to change the color of the memory using an unauthorized color specification.

In one implementation, a CPU may permit sandboxes to change the color of memory regions that they are authorized to access so that they can define sub-sandboxes. This would rely on a definition of pointer security instructions that can derive a new pointer with a different color and identical or narrower bounds to the input pointer. A write-for-ownership instruction could then be used to change the color of the covered region. This would introduce the complication that existing pointers into that region could be invalidated by this conversion operation, but software rules could be defined to prevent such situations from occurring. In other words, software could be written such that any existing pointers into that region that use the old color would no longer be used after the color of that region is updated.

If sandboxes are given the ability to change the colors of memory within the sandbox, it will be necessary to prevent them from coalescing memory regions to expand their level of access beyond the original bounds of the sandbox. This can occur when a sandbox changes the color of memory within the sandbox to match the color of memory that is adjacent but outside the sandbox. Since pointer security circuitry (e.g., pointer security circuitry 126 shown in FIG. 1) bounds are expressed in terms relative to the boundaries between memory of different colors, performing such a recoloring operation can permit unauthorized accesses outside of the sandbox.

This can be prevented in a number of ways. Each sandbox may be restricted to a particular set of colors, e.g. using a configuration register specifying a color mask, and software would avoid allocating regions with any of those authorized colors adjacent to the sandbox. Alternatively, a separate set of memory encryption keys could be assigned to each sandbox to back the colors.

In addition to sandboxing data accesses, code accesses are also sandboxed, according to an embodiment. Code in different sandboxes may be marked with a different color, and unauthorized color changes may be prevented simply by marking the code non-writable. In conjunction with code restrictions, embodiments of the disclosed system may validate prior to running the code that all direct branches in a sandbox use only destinations with the authorized color (although directly checking that they stay in the bounds of the sandbox is also an option), and to instrument all indirect branches so that only the authorized color can be used in their targets. Indirect branches may be redefined to enforce such a restriction, perhaps using a flag to select whether branches to other colors is to be permitted to allow a trusted runtime to jump to arbitrary locations within sandboxes.

Alternatively, a global invariant could be imposed so that the instruction pointer (RIP) has a specified color (e.g. specified in a usermode control register), and any operation that may potentially violate that invariant would be automatically checked by the processor. This embodiment would not impose any extra translation lookaside buffer pressure, assuming that code for sandboxes is page-aligned.

Alternatively, this may help to overcome a limitation of Intel® Control-flow Enforcement Technology (CET), that it does not directly support checking function types/signatures. Functions of a certain type could be clustered in cachelines of a certain color and indirect branches could check that the appropriate color corresponding to a function type is specified in every target used with that branch. An advantage of the approach is that regions containing functions of a given type may be discontiguous and arbitrarily sized, as long as they are cacheline-aligned. This flexibility simplifies compilation and eases support for dynamic loading.

Such a style of type-checking could alternatively be enforced by defining power-of-two aligned regions in which functions with identical signatures are clustered and verifying that indirect branch targets fall within the region with the appropriate type. Not all of those regions would need to be the same size, since the appropriate base/mask check could be performed for each type.

Even with 6-bit memory tags (e.g., color IDs), hashing a function signature down to a 6-bit value could catch a substantial percentage of type mismatches. However, the system may precisely distinguish all possible function signatures by multiplexing a sufficient quantity of keys onto the finite key ID space. For example, as each binary is dynamically loaded, it could request from a key manager component in the OS or in the library a key handle corresponding to a particular function signature. Each signature could be represented by a strong cryptographic hash to simplify lookups. By providing such a lookup service, the system would enable all modules in the program to use the same key handle for the same function signature. The loader would use that key handle when writing any functions of that type into the code storage for that module. Prior to each indirect branch, the program could request that the appropriate key handle be associated with the authorized key ID for that indirect branch. Ideally, key ID collisions between different function types would be rare, so most of these key update operations would be efficient no-ops.

There is a possible hybrid approach between software-only function type checking and enforced function type checking (as disclosed) that would avoid the overhead of key switching in the approach from the preceding paragraph. Indirect branches could be instrumented to check both that their targets fall within some power-of-two-aligned region and that they specify a particular color. This enables supporting multiple "bins" of function types with bin storage boundaries defined by the power-of-two regions and colors being used to distinguish specific types within the bins. This can help to avoid wasted address space and memory in case the memory allocator incorrectly guesses the amount of space needed for individual function types, since remaining unused space in the bin could be allocated to other function types.

These function type checking mechanisms can also be adapted in a straightforward manner to enforce data type checking so that each data access site (i.e. instruction with a memory operand) is only permitted to access objects stored in memory regions allocated for objects of the type supported by that data access site.

As used in this application and in the claims, a list of items joined by the term "and/or" can mean any combination of the listed items. For example, the phrase "A, B and/or C" can mean A; B; C; A and B; A and C; B and C; or A, B and C. As used in this application and in the claims, a list of items joined by the term "at least one of" can mean any combination of the listed terms. For example, the phrases "at least one of A, B or C" can mean A; B; C; A and B; A and C; B and C; or A, B and C.

As used in any embodiment herein, the terms "system" or "module" may refer to, for example, software, firmware and/or circuitry configured to perform any of the aforementioned operations. Software may be embodied as a software package, code, instructions, instruction sets and/or data recorded on non-transitory computer readable storage mediums. Firmware may be embodied as code, instructions or instruction sets and/or data that are hard-coded (e.g., non-volatile) in memory devices. "Circuitry", as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry or future computing paradigms including, for example, massive parallelism, analog or quantum computing, hardware embodiments of accelerators such as neural net processors and non-silicon implementations of the above. The circuitry may, collectively or individually, be embodied as circuitry that forms part of a larger system, for example, an integrated circuit (IC), system on-chip (SoC), desktop computers, laptop computers, tablet computers, servers, smartphones, etc.

Any of the operations described herein may be implemented in a system that includes one or more mediums (e.g., non-transitory storage mediums) having stored therein, individually or in combination, instructions that when executed by one or more processors perform the methods. Here, the processor may include, for example, a server CPU, a mobile device CPU, and/or other programmable circuitry. Also, it is intended that operations described herein may be distributed across a plurality of physical devices, such as processing structures at more than one different physical location. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), embedded multimedia cards (eMMCs), secure digital input/output (SDIO) cards, magnetic or optical cards, or any type of media suitable for storing electronic instructions. Other embodiments may be implemented as software executed by a programmable control device.

The following examples pertain to further embodiments. The following examples of the present disclosure may comprise subject material such as at least one device, a method, at least one machine-readable medium for storing instructions that when executed cause a machine to perform acts based on the method, means for performing acts based on the method and/or a system for forming magnetically lined through-holes in a semiconductor package substrate.

EXAMPLES

Examples of the present disclosure include subject material such as a method, a device, an apparatus, or a system related to protecting computing systems against memory replay attacks, as discussed below.

Example 1

According to this example, there is provided an apparatus. The apparatus includes a plurality of processor cores; cache memory communicatively coupled to one or more of the plurality of processor cores; and pointer security circuitry to define one or more memory tags in memory address pointers, encryption circuitry to cryptographically secure data objects at least partially based on the one or more memory tags.

Example 2

This example includes the elements of example 1, wherein the one or more memory tags include an identification tag to identify a type, a function, a memory location, or a use for a data object.

Example 3

This example includes the elements of example 2, wherein the encryption circuitry uses the identification tag to at least partially define a tweak input to an encryption algorithm.

Example 4

This example includes the elements of example 1, wherein the one or more memory tags include an encryption tag, wherein the encryption circuitry to use the encryption tag to identify one of a number of encryption keys.

Example 5

This example includes the elements of example 1, wherein the one or more tags include a small object tag, the pointer security circuitry to determine a value for tweak input to an encryption algorithm at least partially based on a value of the small object tag.

Example 6

This example includes the elements of example 5, wherein the small object tag indicates that a cacheline includes a number of identification tags associated with a number of subsets of the cacheline, to enable sub-cacheline granularity of memory tagging.

Example 7

This example includes the elements of example 1, wherein the one or more memory tags include a bound distance tag, the pointer security circuitry to identify a distance of stray of a memory address pointer from a location of an object.

Example 8

This example includes the elements of example 1, wherein the one or more memory tags includes a combination of an identification tag and a bound tag embedded within a virtual memory address.

Example 9

This example includes the elements of example 1, further comprising: integrity check circuitry to generate integrity check values at least partially based on a memory location for data and an encrypted value of the data, wherein the pointer security circuitry to detect tampering with a memory address pointer at least partially based on the integrity check values.

Example 10

According to this example, there is provided a computer readable medium having instructions which, when executed by a processor, cause the processor to perform operations, comprising: receive a request to define a memory address pointer; identify a type or function of data referenced by the memory address pointer; generate an identification tag associated with the type or function of the data; embed the identification tag within the memory address pointer; and encrypt the data with an encryption algorithm and with a tweak to the encryption algorithm that is at least partially defined by the identification tag.

Example 11

This example includes the elements of example 10, wherein the identification tag is a first identification tag, wherein the operations further include: receive a request to access the memory address pointer; receive a second identification tag associated with the request to access the memory address pointer; compare the first identification tag to the second identification tag; and deny access to the request to access the memory address pointer, if the first identification tag mismatches the second identification tag.

Example 12

This example includes the elements of example 10, wherein the operations further include: associate the memory address pointer with a number of subsets of objects of a cacheline; and set a small object tag within the memory address pointer to indicate that the memory address pointer is associated with the number of subsets of objects of the cacheline.

Example 13

This example includes the elements of example 12, wherein operations further comprise: associate a plurality of memory tags with the number of subsets of objects of the cacheline to provide sub-cacheline granularity of memory tagging Example 14

This example includes the elements of example 10, wherein the memory address pointer is a virtual memory address pointer.

Example 15

This example includes the elements of example 10, wherein the tweak to the encryption algorithm includes the identification tag and a physical memory address.

Example 16

According to this example, there is provided a system. The system includes a plurality of processor cores; memory circuitry to store pointer security instructions that, when executed by at least one of the plurality of processor cores, cause the at least one of the plurality of processor cores to perform operations, comprising: identify a memory address pointer that points to data having a protected pointer; identify one or more bits within the memory address pointer that represent a protected pointer tag; and set the one or more bits within the memory address pointer to indicate that the memory address pointer points to data having a protected pointer.

Example 17

This example includes the elements of example 16, wherein the operations further include: identify a bound distance for the memory address pointer; and set a bound distance tag within the memory address pointer to indicate the bound distance.

Example 18

This example includes the elements of example 16, wherein the operations further include: associate an identification tag with the memory address pointer; and use the identification tag as a tweak input to an encryption algorithm to encrypt data referenced by the memory address pointer.

Example 19

This example includes the elements of example 16, wherein the memory address pointer translates to a physical memory address pointer, wherein the physical memory address pointer includes an encryption tag that identifies an encryption key for encrypting the data referenced by the memory address pointer.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed:
1. An apparatus, comprising:
a plurality of processor cores;
cache memory communicatively coupled to one or more of the plurality of processor cores;
pointer security circuitry to define memory tags in memory address pointers, the memory tags comprising an identification tag and an encryption tag; and
encryption circuitry to cryptographically secure data objects at least partially based on the memory tags, wherein the encryption circuitry is to use the identification tag to at least partially define a tweak input to an encryption algorithm used to cryptographically secure the data objects and use the encryption tag to identify one or more encryption keys used in the encryption algorithm.
2. The apparatus of claim 1, wherein the identification tag identifies a type, a function, a memory location, or a use for a data object.
3. The apparatus of claim 1, wherein the memory tags include a small object tag, wherein the pointer security circuitry is to determine a value for a tweak input to the encryption algorithm at least partially based on a value of the small object tag.

4. The apparatus of claim 3, wherein the small object tag indicates that a cacheline includes a number of identification tags associated with a number of objects stored in the cacheline with the number of identification tags, to enable sub-cacheline granularity of memory tagging.

5. The apparatus of claim 1, wherein the memory tags include a bound distance tag, wherein the pointer security circuitry is configured to identify a distance of stray of a memory address pointer from a location of an object.

6. The apparatus of claim 1, wherein the memory tags further comprises a bound tag embedded within a virtual memory address.

7. The apparatus of claim 1, further comprising:
integrity check circuitry to generate integrity check values at least partially based on a memory location for data and an encrypted value of the data,
wherein the pointer security circuitry is configured to detect tampering with a memory address pointer at least partially based on the integrity check values.

8. The apparatus of claim 1, wherein the encryption circuitry further is to use the identification tag to identify the one or more encryption keys used in the encryption algorithm.

9. The apparatus of claim 1, wherein the encryption tag is used to identify the one or more encryption keys in a key table of the apparatus.

10. A computer-readable device having instructions, which when executed by at least one processor, cause the at least one processor to perform operations, comprising:
receive a request to define a memory address pointer;
identify a type or function of data referenced by the memory address pointer;
generate an identification tag associated with the type or function of the data;
embed the identification tag within the memory address pointer;
generate an encryption tag that identifies one or more encryption keys;
embed the encryption tag within the memory address pointer; and
encrypt the data with an encryption algorithm using the one or more encryption keys and tweak to the encryption algorithm that is at least partially defined by the identification tag.

11. The computer-readable device of claim 10, wherein the identification tag is a first identification tag, wherein the operations further include:
receive a request to access the memory address pointer;
receive a second identification tag associated with the request to access the memory address pointer;
compare the first identification tag to the second identification tag; and
deny access to the request to access the memory address pointer, if the first identification tag mismatches the second identification tag.

12. The computer-readable device of claim 10, wherein the operations further include:
associate the memory address pointer with a number of objects of a cacheline; and
set a small object tag within the memory address pointer to indicate that the memory address pointer is associated with the number of subsets of objects of the cacheline.

13. The computer-readable device of claim 12, wherein operations further comprise:
store a plurality of memory tags in the cacheline with the number of objects in the cacheline to provide sub-cacheline granularity of memory tagging.

14. The computer-readable device of claim 10, wherein the memory address pointer is a virtual memory address pointer.

15. The computer-readable device of claim 10, wherein the tweak to the encryption algorithm includes the identification tag and a physical memory address.

16. A computer-readable device having instructions, which when executed by at least one processor, cause the at least one processor to perform operations, comprising:
allocate first one or more bits in a memory address pointer to define a bound distance tag to represent an offset for the memory address pointer;
allocate second one or more bits in the memory address pointer to define an identification tag for the memory address pointer, the identification tag for the memory address pointer to represent at least one of a use, a type, or a characteristic of data referenced by the memory address pointer;
read an identification tag for a cacheline, wherein the cacheline referenced by a value of the memory address pointer minus a value of the bound distance tag; and
execute a pointer security operation if the identification tag for the cacheline is not equal to the identification tag of the memory address pointer.

17. The computer-readable device of claim 16, wherein the bound distance tag enables the at least one processor to determine whether the memory address pointer has been manipulated to point to unauthorized objects.

18. The computer-readable device of claim 16, wherein the pointer security operation is a fault operation in response to a pointer security update instruction.

19. The computer-readable device of claim 18, wherein the operations further include: determine an object base address at least partially based on the distance in terms of cachelines.

20. The computer-readable device of claim 16, wherein the bound distance tag includes a distance in terms of cachelines from a current pointer value to an original pointer value for the memory address pointer.

21. The computer-readable device of claim 16, wherein the operations further include:
update the memory address pointer in a first register with an addend in a second register to perform a pointer add command;
identify an identification tag of an object referenced by the updated memory address pointer;
perform a fault operation if the identification tag of a cacheline referenced by the updated memory address pointer is different than the identification tag of the memory address pointer.

22. The computer-readable device of claim 21, wherein identify an identification tag of an object referenced by the updated memory address pointer, includes:
subtract a value of the bound distance tag multiplied by a size of the cacheline to determine bounds of a contiguous region of the identification tag for the memory address pointer.

23. The computer-readable device of claim 21, wherein the operations further include: in response to the pointer add command, perform the fault operation if a size of the memory address pointer is insufficient to store a new bound distance value for the updated memory address pointer.

24. The computer-readable device of claim 16, wherein the operations further include:

define exclusion bands within memory circuitry, wherein the memory circuitry includes cache and/or main memory, wherein the exclusion bands include: a number of bytes having a first identification tag at a beginning a contiguous region within the memory circuitry; and a number of bytes having a second identification tag at an end of the contiguous region.

* * * * *